US012667934B2

(12) United States Patent
Duescher et al.

(10) Patent No.: US 12,667,934 B2
(45) Date of Patent: *Jun. 30, 2026

(54) ABRASIVE DISC WITH VITRIFIED AGGLOMERATE ISLANDS

(71) Applicants:Wayne O. Duescher, Roseville, MN (US); Cameron M. Duescher, Lino Lakes, MN (US)

(72) Inventors: Wayne O. Duescher, Roseville, MN (US); Cameron M. Duescher, Lino Lakes, MN (US)

(73) Assignee: Keltech Engineering, Inc., Roseville, MN (US)

( * ) Notice: Subject to any disclaimer, the term of this patent is extended or adjusted under 35 U.S.C. 154(b) by 468 days.

This patent is subject to a terminal disclaimer.

(21) Appl. No.: 18/191,847

(22) Filed: Mar. 28, 2023

(65) Prior Publication Data

US 2023/0311274 A1 Oct. 5, 2023

Related U.S. Application Data

(60) Provisional application No. 63/325,038, filed on Mar. 29, 2022.

(51) Int. Cl.
B24D 11/00 (2006.01)
C09K 3/14 (2006.01)

(52) U.S. Cl.
CPC .......... B24D 11/001 (2013.01); C09K 3/1436 (2013.01)

(58) Field of Classification Search
CPC .......... B24D 11/001; B24D 3/28; B24D 3/30;
B24D 3/32; B24D 3/348; B24D 3/14;
B24D 3/16; B24D 3/18; B24D 3/20;
B24D 3/22; B24D 7/06; B24D 7/063;
B24D 18/0009; B24D 18/0072; B24D
2203/00;
(Continued)

(56) References Cited

U.S. PATENT DOCUMENTS

| | | | | |
|---|---|---|---|---|
| 5,127,197 | A | * | 7/1992 | Brukvoort .............. B24D 3/002 51/309 |
| 6,371,842 | B1 | * | 4/2002 | Romero ............... B24D 11/001 451/540 |

(Continued)

*Primary Examiner* — Monica S Carter
*Assistant Examiner* — Caleb Andrew Holizna
(74) *Attorney, Agent, or Firm* — Dewitt LLP; Brian R. Pollack, Esq.

(57) ABSTRACT

An abrasive disc sheet article having patterns of vitrified abrasive particle agglomerate molded islands attached in annular bands on a flexible disc backing is used for high-speed water-spray cooled abrading and polishing without hydroplaning of workpieces. Hydroplaning is prevented as excess coolant water flows around the islands instead of forming a thick water film that separates the island abrasive and the workpiece. Vitrification encapsulates individual abrasive particles in glass to strongly support them to resist abrading forces and to allow them to be progressively worn down for full utilization of expensive diamond particles. Slow eroding of the agglomerates also results in very long abrade life of the abrasive discs. A porous filler material attached to the disc backing between the island structures carries water to contact the wafer surface and cool it during abrading. Interchangeable discs having different abrasive particle sizes are quickly attached with vacuum to flat rotatable platens.

20 Claims, 6 Drawing Sheets

(58) Field of Classification Search
CPC ..... C09K 3/1436; B24B 37/21; B24B 37/245;
B24B 37/26
USPC .................................. 451/527, 539, 550, 308
See application file for complete search history.

(56) References Cited

U.S. PATENT DOCUMENTS

2015/0024662 A1 * 1/2015 Duescher .............. H01L 21/304
451/41
2016/0303711 A1 * 10/2016 Kasai ........................ B24D 3/14

* cited by examiner

ABRASIVE DISC WITH VITRIFIED AGGLOMERATE ISLANDS

CROSS-REFERENCE TO RELATED APPLICATIONS

This patent application claims the benefit of priority to U.S. Patent Application Ser. No. 63/325,038 filed Mar. 29, 2022, which is incorporated by reference herein in its entirety for all purposes. Each of U.S. Pat. No. 10,926,378 and U.S. patent application Ser. No. 17/147,883 filed Jan. 13, 2021 is incorporated by reference herein in its entirety for any purpose whatsoever.

BACKGROUND

This patent application references commonly assigned U.S. patents for all purposes in their entireties.

U.S. Pat. No. 794,495 (Gorton) discloses dots of abrasive on round discs formed by depositing abrasive particles on adhesive binder wetted dot areas printed on the backing, primarily to aid the free passage of grinding debris away from the workpiece surface. These dot areas are not elevated as raised island shapes from the surface of the backing.

U.S. Pat. No. 1,657,784 (Bergstrom) discloses a variety of abrasive particle primitive shaped areas with space gaps between the abrasive areas to provide a passageway for grinding swarf.

U.S. Pat. No. 3,246,430 (Hurst), U.S. Pat. No. 2,838,890 (McIntyre) and U.S. Pat. No. 2,907,146 (Dyar) disclose the effect of an uneven abrasive surface on a workpiece article and various techniques to create separated areas of abrasives.

U.S. Pat. No. 3,916,584 (Howard, et al.) discloses the encapsulation of 0.5 micron up to 25 micron diamond particle grains and other abrasive material particles in spherical erodible metal oxide composite agglomerates ranging in size from 10 to 200 microns and more. The large agglomerates do not become embedded in an abrasive article carrier backing film substrate surface as do small abrasive grain particles. In all cases, the composite bead can be at least twice the size of the abrasive particles. Abrasive composite beads normally contain about 6 to 65% by volume of abrasive grains, and compositions having more than 65% abrasive particles are considered to generally have insufficient matrix material to form a strong acceptable abrasive composite granule.

U.S. Pat. No. 4,112,631 (Howard) discloses the encapsulation of 0.5 micron up to micron diamond particle grains and other abrasive material particles in spherical composite agglomerates ranging in size from 10 to 200 microns.

U.S. Pat. No. 4,256,467 (Gorsuch) and U.S. Pat. No. 5,318,604 (Gorsuch. et al.) discloses abrasive articles where the coating of fibrous cloth at island areas built up in raised height by electroplating areas of the cloth positioned in contact with electrically insulated metal having arrays of exposed circular electrically conducting island forming areas. Abrasive particles contained in the electroplating bath are introduced to fall on the upper portion of the plated metal islands during the process of attaching them to the fiber islands.

U.S. Pat. No. 4,311,489 (Kressner) discloses the use of irregular surface agglomerates of abrasive particles and a binder where the agglomerate binder can be weaker than the agglomerate make coat binder to permit gradual wearing down of the agglomerate.

U.S. Pat. No. 4,930,266 (Calhoun, et al.) discloses the application of spherical abrasive composite agglomerates made up of fine abrasive particles in a binder in controlled dot patterns where preferably one abrasive agglomerate can be deposited per target dot by use of a commercially available printing plate. Small dots of silicone rubber are created by exposing light through a half-tone screen to a photosensitive silicone rubber material coated on an aluminum sheet and the unexposed rubber can be brushed off leaving small islands of silicone rubber on the aluminum. The printing plate can be moved through a mechanical vibrated fluidized bed of abrasive agglomerates which are attracted to and weakly bound to the silicone rubber islands only.

The plate can be brought into nip-roll pressure contact with a web backing which can be uniformly coated by a binder resin which was softened into a tacky state by heat thereby transferring each abrasive agglomerate particle to the web backing. Additional heat can be applied to melt the binder adhesive forming a meniscus around each particle, which increases the bond strength between the particle and the backing. The resulting abrasive can have dots of abrasive particles on the backing, but they are only raised away from the backing surface by the diameter of the abrasive agglomerates. Each abrasive agglomerate typically ranges in size from 25 to 100 micrometers and contains 4 micrometer abrasive particles.

U.S. Pat. No. 5,190,568 (Tselesin) discloses a variety of sinusoidal and other shaped peak and valley shaped carriers that are surface coated with diamond particles to provide a passageway for the removal of grinding debris.

U.S. Pat. No. 5,219,462 (Bruxvoort, et al.) discloses the use of dot patterned recesses or through-holes in a backing sheet which are filled with a slurry of fine abrasive particles having an expanding agent which expands the slurry to rise above each recessed hole. The passageways between the raised abrasive composite dots can pass water and slurry until the dots arc worn down. A disadvantage with this type of abrasive article can be that all the abrasive particles contained in the recess hole at a location below the exposed surface of the backing sheet can be lost for abrading use. The importance of the control of height of the top of the dot can be recognized in the disclosure in that a flat mold surface can be pressed against the non-hardened abrasive dots but no description is presented concerning the importance and accuracy of controlling the dot heights.

U.S. Pat. No. 5,232,470 (Wiand) discloses raised molded protrusions of circular shapes composed of abrasive particles mixed in a thermoplastic binder attached to a circular sheet of backing.

U.S. Pat. No. 5,496,386 (Broberg, et al.) discloses the coating of a mixture of diluent particles and shaped abrasive particles on a make coat of resin where the function of the diluent particles is to provide structural support for the shaped abrasive particles.

U.S. Pat. No. 5,549,961 (Haas, et al.) discloses abrasive particle composite agglomerates in the shape of pyramids, truncated pyramids, and beads which are mixed in a slurry having ultrasonic energy used to lower the slurry viscosity and vacuum to minimize air bubbles. Abrasive composites are forced with abrasive article surface densities of 700 to 7,500 mold cavities per square centimeter. A typical truncated pyramid has a height of 3.15 mils (80 micrometer), a base of 7.0 mils (178 micrometer) and a top of 2 mils (51 micrometer) and is continuously abutted with adjacent pyramids to form a flat continuous sheet of abrasive.

U.S. Pat. No. 5,611,825 (Engen) describes resin adhesive binder systems which can be used for bonding abrasive particles to web backing material, particularly urea-aldehyde binders. There is no reference made to forming or abrasive coating abrasive islands.

U.S. Pat. No. 5,820,450 (Calhoun) and U.S. Pat. No. 5,437,754 (Calhoun) discloses the use of individual spaced truncated cones and rectangular agglomerate blocks attached to 50 micrometer (0.00196 inch) thick polyethylene terephthalate (PET).

U.S. Pat. No. 6,228,133 (Thurber, et al.) describes the application of silane coupling agent to abrasive particles which increases the adhesion of the particle to the binder and priming the backing surface for increased adhesion of the binder by corona discharge.

U.S. Pat. No. 6,186,866 (Gagliardi) discloses the use of protrusions having a variety of peak-and-valley shapes comprised of an erodible grinding aid where the protrusion shapes are surface coated with an adhesive resin and abrasive particles are drop coated or electrostatically coated onto the resin forming a layer of abrasive particles conformably coated over both the peaks and valleys. There are apparent disadvantages of this product. Very few abrasive particles reside on the upper most portions of the protrusion shaped peaks and this small fraction of the total number of particles coated on the surface will quickly be worn down or knocked off the peaks by abrading action due to their inherently weak resin support at the curved peak apex.

U.S. Pat. No. 6,217,413 (Christianson) discloses use of phenolic or other resins where abrasive agglomerates are drop coated preferably into a monolayer of abrasive agglomerates. Leveling and truing which levels or evens out the abrading surface can be performed on the abrasive article resulting in tighter tolerance during abrading.

U.S. Pat. No. 6,231,629 (Christianson, et al.) discloses a slurry of abrasive particles mixed in a binder to form truncated pyramids and rounded dome shapes on a backing.

U.S. Pat. No. 6,645,624 (Adefris, et al.) discloses the manufacturing of abrasive agglomerates by use of a high-speed rotational spray dryer to dry a sol of abrasive particles, oxides and water.

U.S. Pat. No. 9,393,673 (Eilers, et al.) discloses an abrasive article having patterns of shallow islands formed by depositing small island-structure areas of a polymer make coat where abrasive particles are deposited on the make coat island-structures. A polymer size coat can be applied over the abrasive particles and make coat islands to structurally reinforce the abrasive particles to resist abrading forces.

U.S. Pat. No. 10,926,378 (Duescher, et al.) discloses an abrasive article having patterns of islands where the island top surfaces are coated with abrasive particles. He does not teach molding of islands on flexible baking discs where the islands contain abrasive particles mixed with an adhesive within the island structures. In particular, he also does not teach the use of vitrified diamond agglomerates that are mixed with an adhesive and molded into island shapes on the surface of a flexible disc backing where the islands are structurally bonded to the island flexible backing.

SUMMARY OF THE DISCLOSURE

The present disclosure relates to abrasive media and processes for manufacturing the abrasive media. The media are thin flexible abrasive sheets used for grinding, lapping or polishing workpiece surfaces. In particular, the present disclosure relates to flexible discs having an annular distribution of spaced vitrified abrasive agglomerate filled island structures where the water-spray cooled flexible discs can be operated at high surface speeds without hydroplaning of workpieces. The abrasive islands route excess coolant water off the island surfaces and into recessed areas between adjacent islands. This action prevents the buildup of a water film between the abraded workpieces and the islands that causes workpiece hydroplaning where the abrasive particles do not contact the surface of the workpieces. Vitrified agglomerates contain abrasive particles encapsulated by glass that supports the particles against abrading forces and provide very long island disc abrade life.

By comparison, conventional liquid slurry lapping systems can not be operated at high abrading speeds because they produce thick liquid water films at high abrading speeds that separate workpiece surfaces from abrasive particles that are carried by moving platens. The use of the terms "wafers" and "workpieces" are used interchangeably in the present disclosure.

Vitrified abrasive agglomerates allow the use of a wide range of abrasive diamond particles sizes ranging from small sub-micron sized particle to 100 micron (0.004") or larger particles that are all fully utilized as they are progressively worn away during abrading action. The glass in the vitrified agglomerates that encapsulates the diamond abrasive particles strongly support the individual particles against abrading forces as the agglomerates are slowly eroded to release fresh new diamond particles as the spent diamond particles are ejected from the agglomerates. Use of precision-thickness abrasive agglomerate island discs having different sized diamond abrasive particles allows the flexible island discs to be quickly used interchangeably by attaching the islands discs with vacuum to a precision-flat platen surface. With respect to another embodiment in accordance with the present disclosure, the island disc backing substrate bottom disc-mounting surfaces can be coated with a pressure sensitive adhesive (PSA) to mount the island disc to a flat platen surface.

The top surfaces of solidified individual islands bonded to a backing can be ground into a common plane to establish a precisely controlled thickness relative to the bottom surface of the disc backing material. It can be not critical that the absolute island thickness, relative to the bottom surface of the disc backing, can be precisely controlled. Rather, it can be only important that the heights of the top surfaces of the islands are in a common plane that can be parallel to the bottom mounting surface of the disk backing substrate.

Expensive diamond particles are fully utilized. The fixed abrasive diamond particles progressively wear down and continually provide sharp cutting leading edges until they are ejected from the agglomerate glass matrix that erodes until fresh new sharp diamond particles are exposed. The island erode rates are controlled by the selection of optional filler materials mixed with the agglomerates, the agglomerate materials, the selected adhesive used to support the agglomerates within the island structures and the processes used to make both the agglomerates and the island structures. The vitrified island structures can be porous or solid.

Annular bands of patterns of vitrified agglomerate island structures attached to an island disc are used to abrade wafers attached to a wafer disc that are in flat contact with the islands where the wafers slightly overhang both the inner and outer radius of the island annular band. This arrangement provides uniform wear of the full surface of the contacting wafers, and uniform wear of the disc islands when both the wafer disc and the island disc are rotated in the same direction and approximately at the same rotational speeds.

Commercially available non-annular fixed-abrasive disc articles presently used for abrasive lapping cannot simultaneously produce both a precision-flat and smooth workpiece surface that can be required for flat lapping. Continuous flat coated fixed-abrasive discs that do not have an annular band of coated abrasive have relatively slow moving and slow abrading surfaces at the inner disc diameter areas. These localized reduced cut rates occur at these disc inner-radius slow-moving areas because abrasive cut rates are directly proportional to localized abrading speeds. Fixed-abrasive discs having a continuous coated surface of small abrasive particles have reduced cut rates when used with a water lubricant at high lapping speeds because of hydroplaning. When a workpiece hydroplanes, it can be lifted away from the flat moving abrasive by a boundary layer water film and prevents contact of the abrasive particles with the workpieces.

The surface discontinuities provided by a series of independent gap-spaced raised islands break up the abrading coolant water boundary layer that builds in thickness as a function of the land length between the abrasive surface and the workpiece. Reduction of the boundary layer, which lifts the workpiece unevenly away from the abrasive surface, minimizes the occurrence of hydroplaning of the workpiece thereby producing flatter workpiece parts. The boundary layer thickness changes not only as a function of the length of a continuous abrasive segment in contact with a moving water film but also with the relative velocity between the abrasive segment and the moving water.

Workpiece hydroplaning with the use of abrasive islands occurs in the same way that an automobile tire having a pattern of ribbed tire treads (abrasive islands) maintains more intimate contact with a wet road surface than does a bald smooth surfaced tire (non-island abrasive). Abrasive media having a pattern of small-sized abrasive agglomerate filled raised islands maintains more intimate contact with a water-cooled workpiece surface than does abrasive media that can have a continuous layer of small-sized abrasive particles coated directly on the surface of a backing sheet. The island abrasive allows the abrasive media to be used for high-speed liquid cooled abrading. Abrasive particles must be in direct abrading contact with a workpiece to enable material removal from the workpiece. If a portion of the workpiece can be floated above the abrasive due to the separation caused by the thickness of the induced water boundary layer that causes hydroplaning, no abrading contact can be made with the workpiece in that area. Excess coolant water freely passing through recessed flow channels formed by the valley-passageways between the raised islands flushes out grinding swarf and prevents swarf debris particles from scratching the surface of a workpiece when they are lodged between the moving abrasive and the workpiece surface.

High abrading surface speeds are required to effectively utilize the cutting action of diamond abrasive that can produce very high material removal rates on very hard substrate workpiece materials such as sapphire. The small 3 to 20 micron-sized, or sub-micron sized, abrasive particles, that are required to produce smooth workpiece surfaces, are typically too small to be directly coated on backings as they quickly are worn away during an abrading operation. Instead, the small particles are encapsulated in relatively large vitrified abrasive agglomerates that are molded into island shapes that are attached to flexible disc substrate backings.

Abrasive particle materials include diamond, silicon carbide, boron carbide, cubic boron nitride, gallium carbide, aluminum oxide, ceria, silica and combinations thereof. Typically, three sizes of abrasive particles are sequentially used to polish a workpiece or wafer: coarse, medium and fine. Diamond abrasive particles are often used to lap or polish hard workpiece materials including sapphire. Coarse diamond particles are used to initially flatten a workpiece, medium sized particles are used to develop a smooth surface and very small particles are used to create ultra-smooth surfaces.

Vitrified agglomerates are mixed with a solvent-based or non-solvent adhesive and deposited in 0.032" to 0.062", or greater, thick mold substrates having 0.050 to 2.0" hole diameters to form 0.050 to 2.0" diameter or 0.050 to 2.0" sized molded island structures that are bonded in annular band patterns to polymer or metal flexible disk backing substrates. Holes in the mold substrates are large enough that the selected agglomerates fit into the holes without the agglomerates extending above the surface of the mold substrate. The shapes of the molded island structures include circular, ellipse, diamond-shaped, rhombus or rectangular island shapes where circular island shapes are preferred. The backing substrate circular outer diameters can range from 1 inch to 144 inches where they are used to produce abrasive island discs having outer diameters than can range from 1 inch to 144 inches.

When the island structures are mold-formed, the mold substrate bottom surface can be positioned in flat surfaced conformal contact with the backing substrate top surface and a mixture of vitrified abrasive agglomerates and an island adhesive can be deposited into the mold substrate through-holes. The mixture of vitrified abrasive agglomerates and an island adhesive contacts the backing substrate top surface and the mixture of vitrified abrasive agglomerates and an island adhesive can be level filled with the mold substrate top surface. The island adhesive contacting the backing substrate top surface bonds the mixture of vitrified abrasive agglomerates and an island adhesive to the backing substrate top surface. With respect to one embodiment in accordance with the present disclosure, an island binder adhesive can be deposited in the mold substrate through-holes and contact the backing substrate top surface prior to deposition of the mixture of vitrified abrasive agglomerates and an island adhesive in the mold substrate through-holes where the mixture of vitrified abrasive agglomerates and an island adhesive contact the island binder adhesive.

With respect to another embodiment in accordance with the present disclosure, the backing substrate top surface can be coated with an adhesive prior to the mold substrate being placed in flat-surfaced contact with the backing substrate top surface where the mixture of vitrified abrasive agglomerates and an island adhesive deposited in the mold substrate through-holes contacts the backing substrate top surface adhesive coat. The island through-hole adhesive or the backing substrate top surface adhesive provides a strong bond of the mixture of vitrified abrasive agglomerates and an island adhesive to the backing substrate top surface when both the island adhesive and the island binder adhesive are solidified.

A wide range of fillers can be added to the mixture of vitrified abrasive agglomerates and an island adhesive that can be used to mold-form island structures that are bonded to polymer or metal backing substrates. These island fillers are used to control the erode rates of the solidified vitrified abrasive agglomerates and island adhesive island structures. The erodible filler comprises erodible fillers selected from the group consisting of walnut shell particles, hollow glass beads, hollow polymer beads, organic material particles, foamed glass beads and combinations thereof. With respect to another embodiment in accordance with the present disclosure, the mixture of vitrified abrasive agglomerates and an island adhesive are porous where the vitrified abrasive agglomerates are structurally supported by the vitrified abrasive agglomerate island adhesive that coats the surfaces of and mutually bonds adjacent abrasive agglomerates and any fillers where voids exist between adjacent abrasive agglomerates and any fillers upon solidification of the island are in a common plane and have the same elevation from the disc backing disc mounting surface to avoid non-smooth abrading and to fully utilize the abrasive particles at the top surface of all the islands. Providing precision-thickness abrasive discs allows them to be repetitively used interchangeably on precision-flat rotatable platens that operate at very high abrading speeds from 500 to 3,000 rpm for a 12" vitrified agglomerate island disc.

The adhesive material used in the vitrified agglomerate island structures can be solvent-based or non-solvent adhesives including epoxies, phenolics, polyurethanes, acrylates, acrylics, and other adhesives and combinations thereof. The island structure adhesives can be solidified by different processes including room temperature polymerization, heat, ultraviolet curing or by electron-beam curing. The adhesives can also contain solvents including water, alcohols, MEK, toluene and other solvents that evaporate. By mixing controlled fixed quantities of binder resin adhesives with controlled fixed quantities of abrasive particles, the ratio of adhesive to particles can be controlled exactly whereby each abrasive disc produced can be exactly the same.

The abrasive island structures can be bonded to the backing substrate in an array pattern band having an array pattern band approximate annular shape, an array pattern band approximate annular outer diameter, an array pattern band approximate annular inner diameter where gap spaces exist between adjacent abrasive island structures. Here, the array band approximate annular shape can be made of island structures arranged in patterns of columns and rows that have an array pattern band approximate annular outer diameter and an array pattern band approximate annular inner diameter with controlled gap spaces between adjacent abrasive island structures.

A porous island gap space erodible material that can be attached to the backing substrate top surface in the gap spaces between adjacent abrasive island structures that can have a top surface that can be level with the abrasive island structures flat top surfaces can be used to carry coolant water that wets the surface of the wafer as it can be being abraded. Heat generated by the friction of abrasive moving across the surface of a wafer increases the temperature of both the wafer and the abrasive. Abrading tests have shown that localized interior surface area portions of a wafer can be raised in temperature and expand which concentrates the abrading on the expanded wafer area, which causes it to expand even more. After abrading, and the expanded area cools down and shrinks, the over-abraded area can be recessed relative to the adjacent portions of the wafer, resulting in a non-flat wafer. The porous erodible island spacer material mixed with the adhesive material can be selected from the group consisting of solid glass beads, hollow glass beads, organic particles, inorganic particles or combinations of them.

Water spray that can be applied to the rotating island disc surface can be absorbed by the porous erodible material adjacent to the island structures and can be wiped on to the wafer surface. This water film thickness can be less than the distance that the agglomerates extend above the surface of the islands which allows the agglomerate abrasive particles to contact and abrade the wafer surface. However, due to the huge heat-of-vaporization cooling effects of water that can be changed from a liquid to vapor after reaching the boiling temperature of water, the wafer surface can be held at a temperature of 212 degrees F. or less by the very thin film of coolant water on the wafer. The porous media between the islands continually erodes during the wafer abrading process where the top exposed surface of the porous media layer remains substantially level with the top surfaces of the islands as the disc islands are eroded by abrading contact with a workpiece of wafer.

The porous island gap space erodible material can be a porous polymer foam material that can be attached to the backing substrate top surface in the gap spaces between adjacent abrasive island structures wherein the porous polymer can be an erodible material having a top surface that can be level with the abrasive island structures flat top surfaces.

With respect to another embodiment in accordance with the present disclosure, the porous island gap space erodible material can be constructed from erodible material particles or beads selected from the group consisting of walnut shell particles, hollow glass beads, solid polymer beads, hollow polymer beads, organic material particles, foamed glass beads and combinations of these materials. Here, the selected erodible material particles or beads can be individually surface-coated with an adhesive, mixed together and deposited on the backing substrate top surface in the gap spaces between adjacent abrasive island structures where the erodible material particles or beads contact adjacent erodible material particles or beads and the adjacent selected erodible material particles or beads are bonded together at their mutual adhesive coated contact points. Voids between the adjacent selected erodible material surface-coated particles or beads form a porous island gap space erodible material. An adhesive can be coated on the backing substrate top surface in the gap spaces between adjacent abrasive island structures and can be coated on the walls of the island structures before the erodible material surface-coated particles or beads can be deposited on the backing substrate top surface in the gap spaces between adjacent abrasive island structures.

With respect to another embodiment in accordance with the present disclosure, grooves are formed, molded or cut in the porous island gap space erodible material top surface between island structures. The grooves allow drainage of excessive water that can be captured in the porous island gap space erodible material to prevent formation of a continuous surface of water surrounding the island structures that causes hydroplaning of the workpieces during abrading where the abrasive particles in the island agglomerates do not contact and abrade the workpieces.

In further accordance with the disclosure, lapping, polishing and grinding can be performed on the surface of a workpiece part by placing the workpiece in moving contact with a raised island abrasive disc and controlling both the contact force holding the workpiece against the abrasive and the relative abrading speed between the workpiece and the island abrasive. An increased contact force results in higher workpiece material removal rates. Increasing the abrading speed also increases the workpiece cut rate. Abrasive polishing of hard-material workpieces typically can be done with the sequential use of coarse, medium and fine sized abrasive particles. High-speed polishing of hard sapphire wafers or workpieces can be done with a water spray coolant when the fixed-abrasive discs have annular bands of raised islands filled with abrasive agglomerates to avoid hydroplaning of wafers. Interchangeable flexible discs having different sized abrasive particles and precision-flat islands can be quickly attached with vacuum to precision-flat platens.

Abrasive lapping or polishing of sapphire workpieces or wafers can be done in large volumes for cell phone camera lenses, watch crystals, LED devices and semiconductors. Sapphire is almost as hard as diamond which can be commonly used as an abrasive. Most semiconductor wafers are made from silicon but other semiconductor materials include silicon carbide, and gallium nitride which are even harder than sapphire. Abrasive agglomerate island discs filled with a wide range of abrasive particles can also be used at high speeds to abrade hard metals or ceramics used for industrial components such as seals.

Lapping or polishing workpieces with fixed-abrasive agglomerate filled raised island structures attached to a flexible sheet can be performed at high surface speeds of 5,000, 7,500 and 10,000 or more surface feet per minute. Water spray can be used to cool the workpiece and to carry away abrasive swarf. A workpiece can be held rigidly or flexibly by many different types of supports, including, by way of non-limiting examples, a rotating spindle platen to effect workpiece abrading contact with a rotating abrasive platen. Hydroplaning of the workpiece on water cooled abrasive can be minimized when using abrasive raised island discs. By comparison, hydroplaning tends to occur for conventional uniformly coated abrasive non-raised island lapping film discs operated at high abrading speeds in the presence of required water coolant.

In embodiments in accordance with the present disclosure, agglomerate island disc diameters can range in size from 1 inch to 144 inches. The island structures can have cross-sectional area sizes that range from 0.050 inches to 2.0 inches and have island structure heights that range from 0.010" to 0.200" as measured from the island structure base at the top surface of the disc substrate to the top surface of the island structures. The controlled distances between adjacent island structures can range from 0.002 inches to 0.250 inches, for example, or any dimension therebetween in increments of 0.001 inches. Island structures can have a range of shapes and a range of sizes from 0.050 inches to 2.0 inches.

In embodiments in accordance with the present disclosure, it can be preferred that the island structure array pattern band approximate annular outer diameter ranges from 70% to 100% of the backing substrate diameter and the array pattern band approximate annular inner diameter ranges from 10% to 90% of the backing substrate diameter. The backing disc substrates can be fabricated from flexible or rigid materials including polymers, metals, inorganics, cloth, woven fibers and combinations of these materials. The backing substrate bottom surface can be sealed and not porous to allow vacuum attachment of the backing substrate to the platen flat surface.

The preferred shape of the mold substrate through holes can be cylindrical. With respect to an embodiment in accordance with the present disclosure, the mold substrate island through holes can be arranged in annular band patterns that can be concentric or non-concentric with the disc substrate. With respect to another embodiment in accordance with the present disclosure, the mold substrate through holes can be arranged in non-annular band patterns that can be concentric with the disc substrate or non-concentric with the disc substrate. With respect to an embodiment in accordance with the present disclosure, the mold substrate through holes can be arranged in random patterns on the abrasive disc and the through holes in the mold substrate can be tapered to allow easy separation of the mold substrate from the solidified molded islands.

In another embodiment in accordance with the present disclosure, use of an erodible porous layer of material between island structures attached to an abrasive disc backing that can have a top surface level with the top surfaces of the islands can be very effective in applying a film of coolant water on the wafer surfaces during a wafer abrading procedure. The water film coated on the wafer surfaces cools the wafer surfaces but can be thin enough that the abrasive particles in the agglomerates encapsulated in the island structures contact and abrade the wafer surfaces. The porous layer can erode and can be worn down to remain level with the island structures by abrading contact of the wafer surfaces with the porous layer. Abrading debris accumulated in the porous layer can be periodically flushed from the porous layer by directing a jet of water on the rotating or stationary island disc. Also, the island disc can be removed from the lapper platen and washed with water to remove the debris from the porous layer.

In another embodiment in accordance with the present disclosure, the erodibility of abrasive island structures attached to abrasive disc backings can be increased by adding erodible fillers with the agglomerates that are encapsulated with an adhesive to form rigid island structures. One erodible filler shown by sapphire abrading tests to provide substantially increased island erodibility can be the addition of foamed glass beads in the islands.

The above advantages and features are of representative embodiments only, and are presented only to assist in understanding the disclosure. It should be understood that these are not to be considered limitations on the disclosure as defined by the claims. Additional features and advantages of embodiments of the disclosure will become apparent in the following description, from the drawings, and from the claims.

BRIEF DESCRIPTION OF THE DRAWINGS

Further objects and advantages of the disclosure will become apparent from the following description and from the accompanying drawings, wherein.

DETAILED DESCRIPTION

Figure 1:
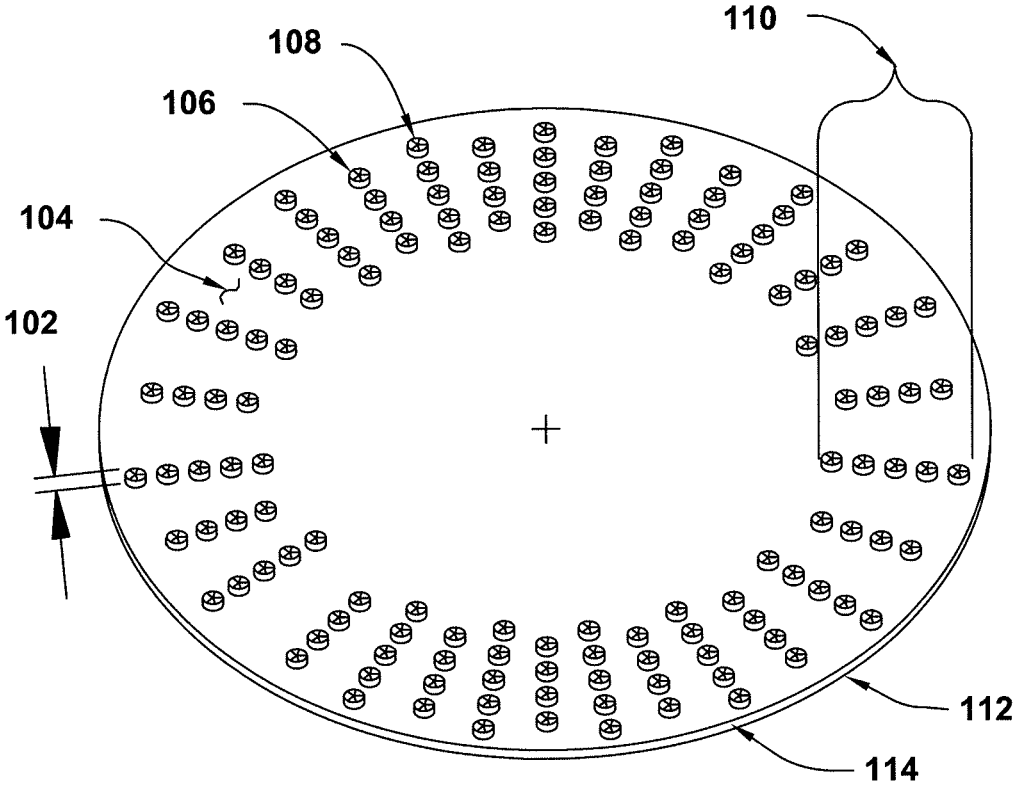
FIG. 1 is an isometric view of an abrasive disc with an annual band of raised islands.

For purposes of illustration, and not limitation, as embodied herein, FIG. 1 is an isometric view of an abrasive disc with an annual band of raised islands. A flexible abrasive disc 112 can have attached raised island structures 106 that are filled with vitrified abrasive particles agglomerates 108 where the island structures 106 are attached to a flexible polymer or metal disc backing substrate 114. The raised-island disc 112 can have annular bands of abrasive-coated 108 raised islands 106 where the annular bands of islands 106 have a radial width of 110. Each island 106 can have a typical size or width 102. The islands 106 can be circular as shown here or can have a variety of shapes comprising radial bars, ellipses, diamond shapes, rectangular shapes, hexagons, smooth-corner hexagons and other shapes (all not shown) where the vitrified agglomerate 108 filled raised islands 106 allow the abrasive discs 112 to be used successfully at very high abrading speeds in the presence of coolant water or water spray without hydroplaning of the workpieces (not shown). There are channel gap openings 104 on the abrasive disc 112 between the raised island structures 106.

For high-speed flat lapping or polishing, the abrasive disc 112 can have an overall thickness variation, as measured from the top surface of the agglomerate 108 filled raised islands 106 to the bottom surface of the abrasive disc backing 114, that can be typically less than 0.0005 inches. The abrasive disc 112 islands 106 precision surface flatness can be necessary to provide an abrasive coating that can be uniformly flat across the full annular band abrading surface of the abrasive disc 112. Planar flatness of the islands 106 allows the rotating abrasive disc 112 to be used at very high abrading speeds of 10,000 surface feet (3,048 m) per minute or more and provide "smooth" abrading where all the islands 106 top surfaces are in abrading contact with the workpiece abraded surface. When the disc 112 can have a few islands 106 that extend above the common plane of the all the disc 112 islands 106, these "tall" islands 106 are in intermittent contact with the workpiece as the disc 112 rotates which results in a non-smooth abrading action.

High abrading speeds are desirable as the workpiece material removal rate can be directly proportional to the abrading speeds. These abrasive discs are particularly useful for high-speed polishing of sapphire wafers and other sapphire components used in cellular phones and watch crystals, electronic display device monitor screens, LED wafers and semiconductor wafers. These vitrified agglomerate island discs provide very substantial production time and cost savings, often with 10 times faster sapphire workpiece cut rates as compared with conventional liquid abrasive slurry lapping and polishing of sapphire devices. The vitrified diamond particle abrasive agglomerates provide very long disc 112 abrade lives.

Figure 2:
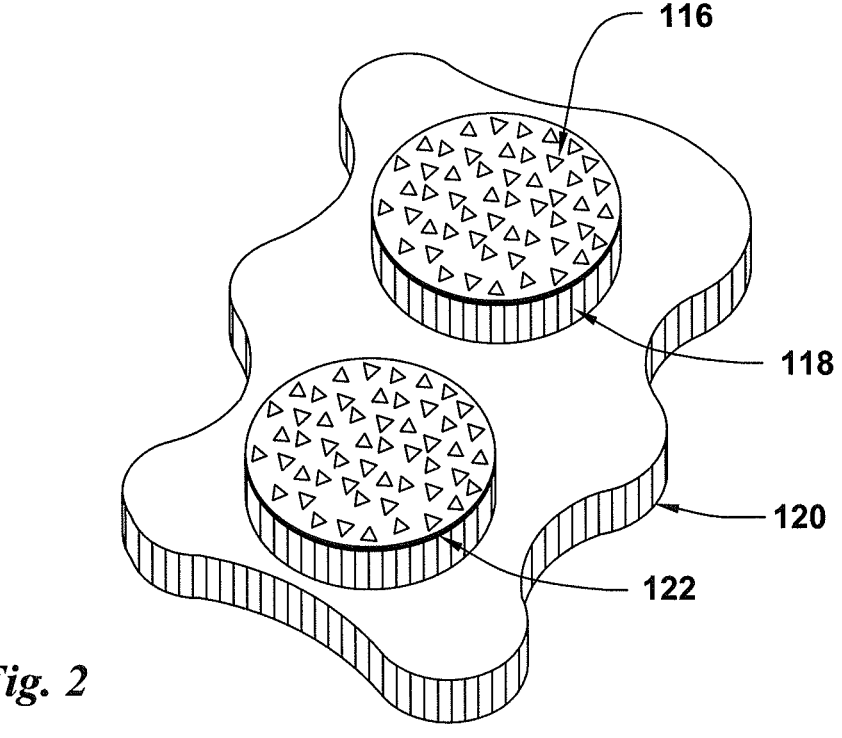
FIG. 2 is an isometric view of a portion of an abrasive disc with individual raised islands.

FIG. 2 is an isometric view of a portion of an abrasive disc with individual raised islands. A flexible backing substrate 120 can have raised island structures 118 filled with an erodible solidified abrasive mixture 122 filled with abrasive particles encapsulated in vitrified agglomerates 116. The sizes of the abrasive particles (not shown) contained in the agglomerates 116 range submicron sizes to 100 microns or greater used to polish semiconductor wafers.

Figure 3:
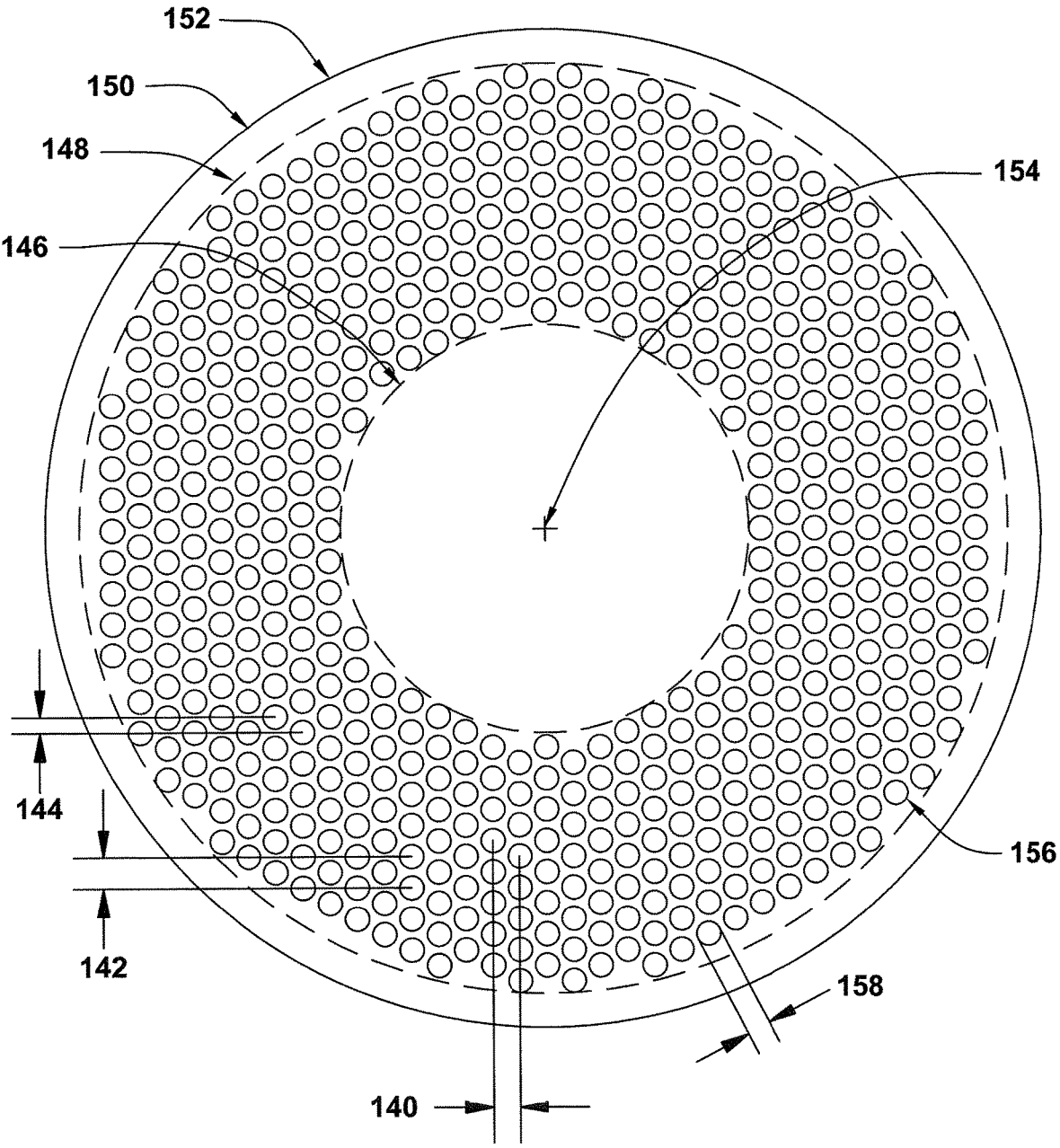
FIG. 3 is a top view of an abrasive disc with an annular band of abrasive coated islands.

FIG. 3 is a top view of an abrasive disc with an annular band of individual abrasive agglomerate filled raised islands. The abrasive disc 150 can have an outer disc diameter 152 and an annular band of abrasive agglomerate raised islands 156 where the annular band can have an approximate outer diameter 148 and an approximate inner diameter 146. The abrasive disc 150 can have a rotation center 154. The individual islands 156, shown as cylindrical, have island diameters 158. The array of islands 156 shown here can be constructed as a rectangular array with a nominal distance 140 between the vertical columns of the centers of the islands 156 and a vertical distance 142 between the centers of the islands 156 and the vertical distance 144 between the centers of the of islands 156 in offset horizontal rows of islands 156.

To provide uniform wear-down of the abrasive coated raised islands 156 the annular band approximate outer diameter 148 can be typically 3 times the approximate inner diameter 146 and can range from 1.5 to 6 times the approximate inner diameter 146. Also, the annular band approximate outer diameter 148 can range from 70% to 100% of the backing substrate outer diameter 152 and the array pattern band approximate annular inner diameter 146 can range from 10% to 90% of the backing substrate outer diameter 152.

The workpieces (not shown) are somewhat larger than the annular width of the abrasive band and overhang both the annular band inner 146 and outer band 148 diameters to provide uniform wear-down of the annular band of raised islands 156 as both the workpiece and the abrasive disc are rotated in the same direction. The pattern of abrasive coated raised islands 156 are shown positioned with a rectangular grid spacing but they can be positioned with a wide range of non-rectangular grid patterns (not shown).

Figures 4, 5:
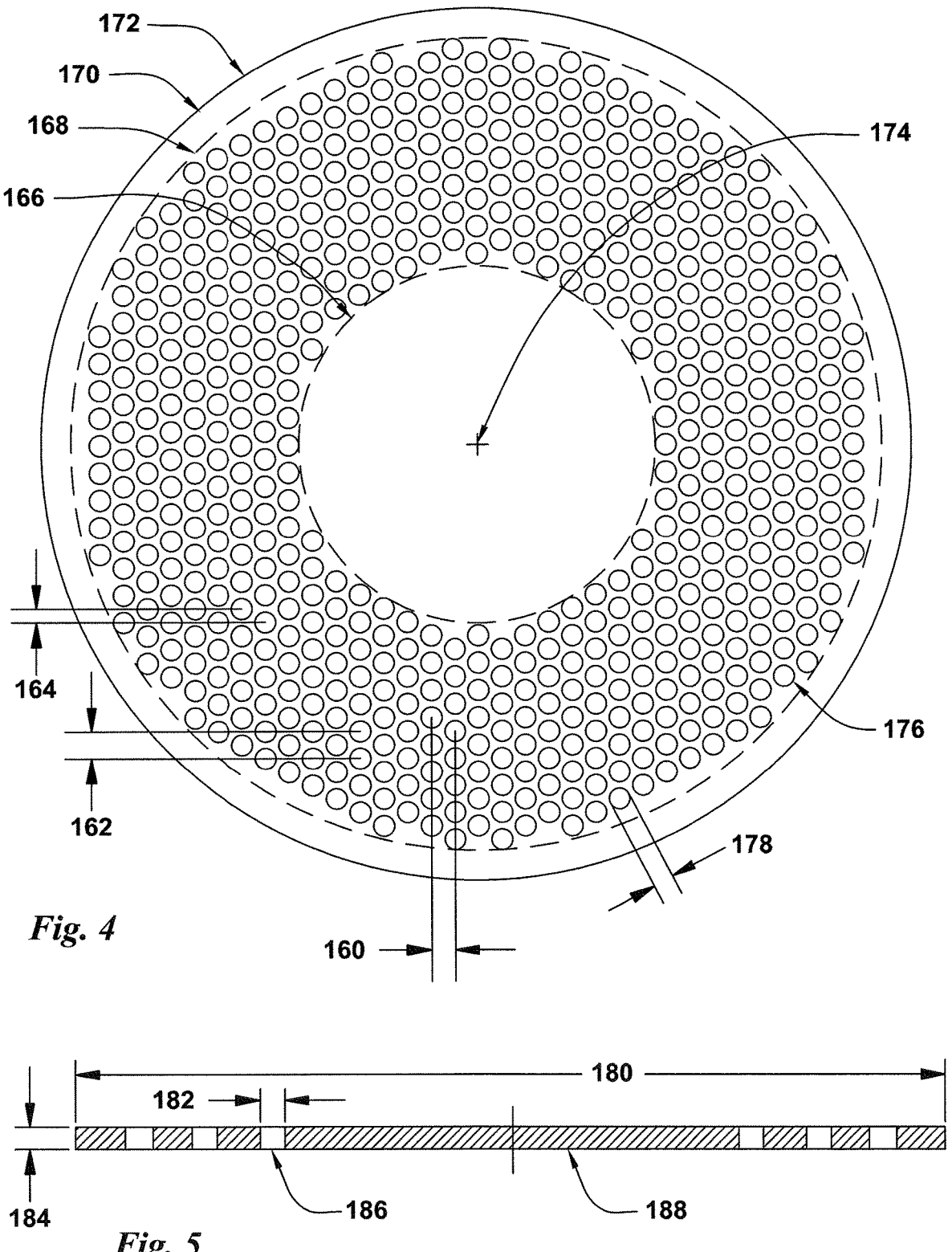
FIG. 4 is a top view of an island mold substrate disc.
FIG. 5 is a side view of an island mold substrate disc.

FIG. 4 is a top view of an island mold substrate disc having an open hole pattern that matches the annular band of individual abrasive agglomerate raised islands shown in FIG. 3. The island mold disc 170 can have an outer diameter 172 and an annular band of island mold disc holes 176 where the annular band can have an approximate outer diameter 168 and an approximate inner diameter 166. The island mold disc 170 can have an island mold disc center 174. The individual circular holes 176 have hole diameters 178. The array of holes 176 shown here can be constructed as a rectangular array with a nominal distance 160 between the vertical columns of the centers of the holes 176 and a vertical distance 162 between the centers of the holes 176 in columns of holes 176 in and the vertical distance 164 between the centers of the of holes 176 in offset horizontal rows of holes 176.

The circular island mold disc 170 can be positioned concentric with an abrasive disc backing substrate (not shown) to mold-form vitrified agglomerate abrasive islands (not shown) on the abrasive disc substrate. The island mold disc 179 holes 176 are shown as circular, but they can have many shapes including elliptical, rhombus, pie and rectangular shapes or shape combinations (not shown) and the individual raised island structure shapes can be nominally equal in size or the shapes can be nominally unequal in size.

FIG. 5 is a side view of an island mold substrate disc where the island mold disc 188 can have an outer diameter 180 and a uniform thickness 184 with a pattern of holes 186 that extend through the thickness 184 of the font sheet 188. Each hole 186 can have a hole shape and hole size where a circular hole 186 can have a hole diameter 182.

Figure 6:
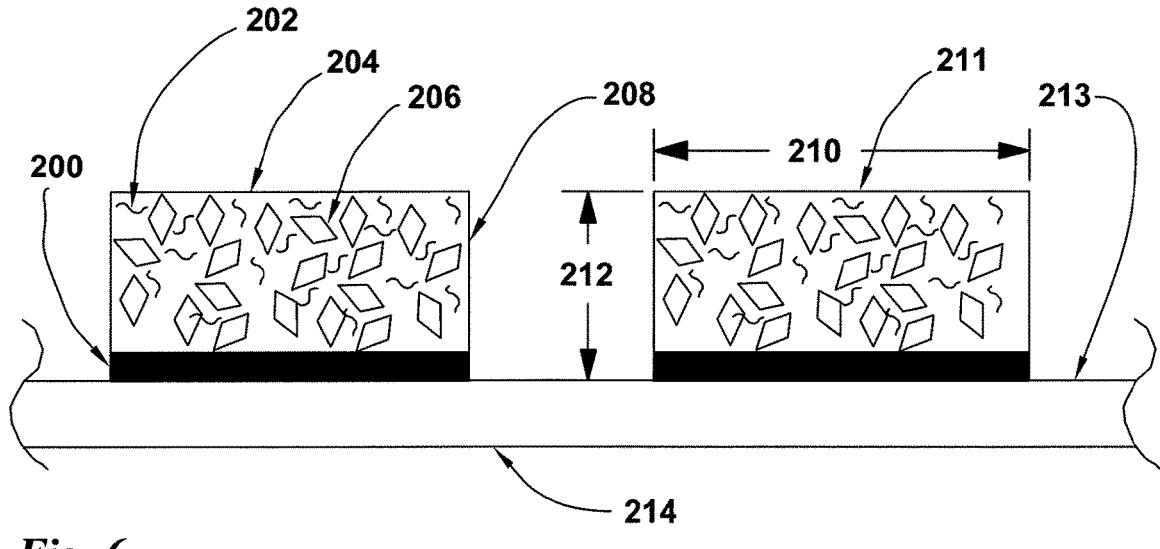
FIG. 6 is a side view of vitrified abrasive agglomerate islands on a backing disc.

FIG. 6 is a side view of vitrified abrasive agglomerate islands on a backing disc. Truncated cylinder islands 204 having island walls 208 and flat island surfaces 211 are filled with abrasive agglomerates 206 encapsulated with an adhesive 202 and mold-formed with an island mold substrate (not shown) and bonded with an adhesive 200 to the top surface 213 of a flexible polymer or metal disc backing 214. The erodible circular islands 204 have island heights 212 and island diameters 210.

Figure 7:
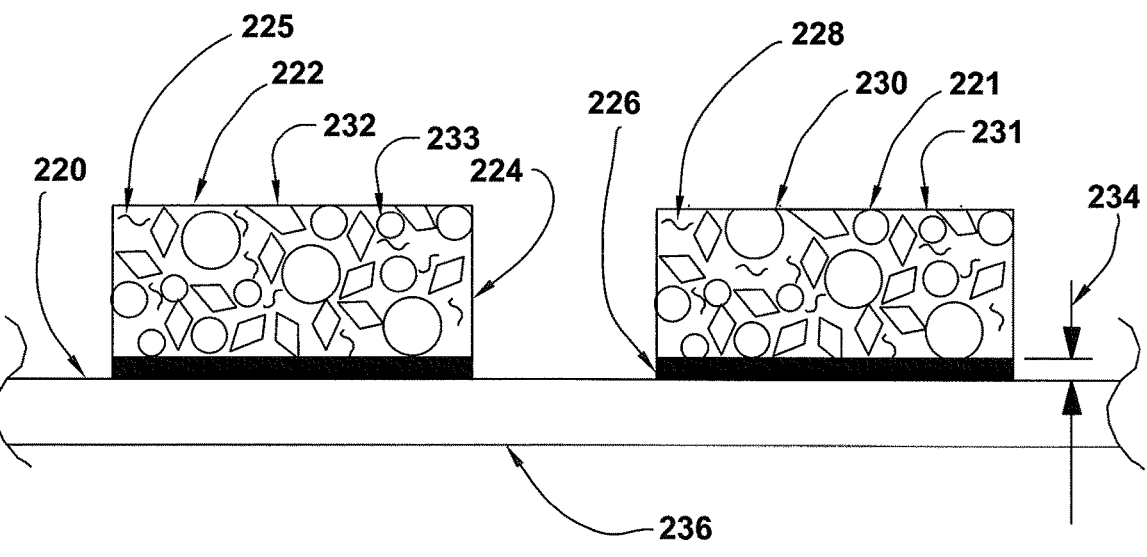
FIG. 7 is a side view of vitrified abrasive agglomerate and bead islands on a backing disc.

FIG. 7 is a side view of vitrified abrasive agglomerate and bead islands on a backing disc. Truncated cylinder islands

222 having island walls 224 and flat island surfaces 231 are filled with abrasive agglomerates 232 and large island filler foamed glass beads 230, medium sized foam glass beads 221 and small foam glass beads 233. The abrasive particle (not shown) filled vitrified agglomerates 232 and the foam glass beads 230, 221 and 233 are encapsulated with an adhesive 225 and mold-formed with an island mold substrate (not shown) and bonded with an adhesive 226 having an adhesive thickness 234 to the top surface 220 of a flexible polymer or metal disc backing 236. The vitrified abrasive agglomerate 232 and the large, foamed glass bead 230 are shown with abraded flat surfaces. The foam glass beads 230, 221 and 233 are rigid, fragile and easily eroded and are used to increase the erodibility of the abrasive islands 222 to better expose the agglomerates 232 above the surfaces 231 of the islands 222. Other organic and non-organic erodible particles including crushed walnut shells can also be used as island 222 fillers to increase the erodibility of the islands 222.

Figure 8:
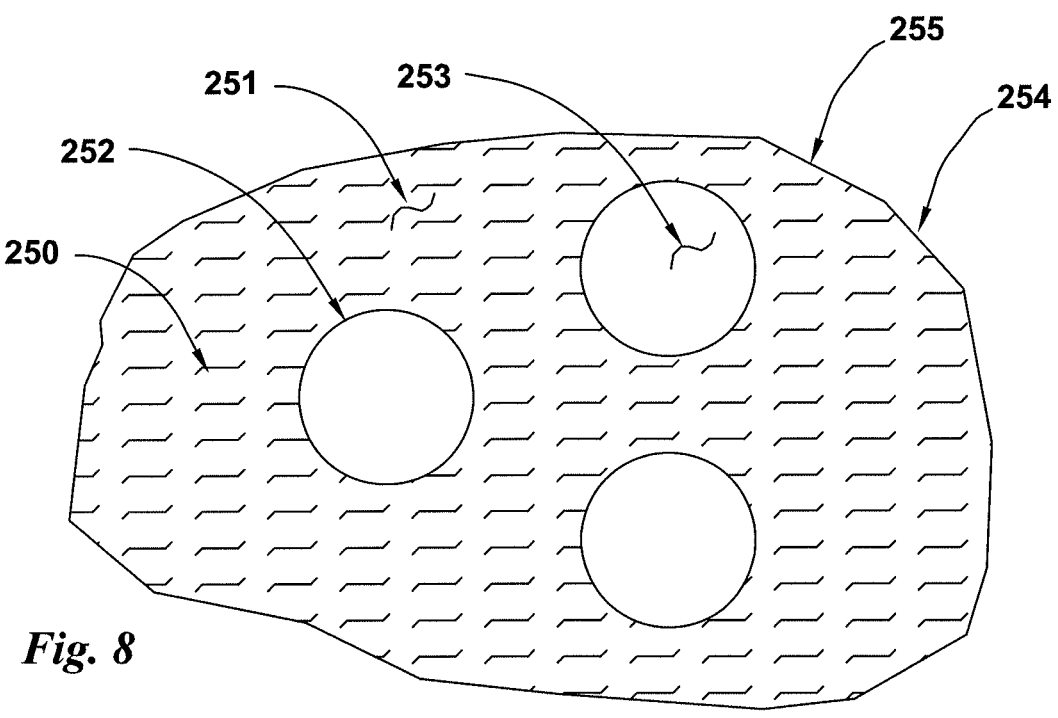
FIG. 8 is a top view of an island disc portion with a porous material between islands.

FIG. 8 is a top view of an island disc portion with a porous material layer between islands. A portion of an abrasive island disc 254 is shown with abrasive agglomerate islands 252 surrounded by a layer of porous erodible material 250. The porous erodible layer 250 can be bonded to the top surface 251 of an abrasive disc backing 255 where the porous erodible layer 250 can have a top surface that can be level with the top surfaces 253 of the islands 252. The porous erodible layer 250 carries coolant water to coat the abraded surface of a wafer (not shown) to remove heat generated by abrading friction when abrasive polishing a wafer. In another embodiment in accordance with the present disclosure, an erodible foam material 250 can be attached to or molded to the top surface 251 of the disc backing 255. The erodible porous layer 250 can be level, or made level, with the top surface 253 of the islands 252. The top surface of the porous erodible layer 250 can be eroded by contact with the wafer (not shown) during an abrading operation where the top surface of the eroded porous erodible layer 250 remains level with the top surface 253 of the islands 252 as the top surfaces 253 of the islands 252 are eroded and worn down.

In a further embodiment in accordance with the present disclosure, a self-adhering erodible foam material 250, including polyurethane foam (not shown), or other spray foam materials, can be sprayed on the top surface 251 of the disc backing 255 where the erodible foam layer 250 adhesively bonds to the top surface 251 of the disc backing 255. After solidification of the erodible foam material 250 the foam material 250 can be cut, skived or ground level with the top surface 253 of the islands 252.

Figure 9:
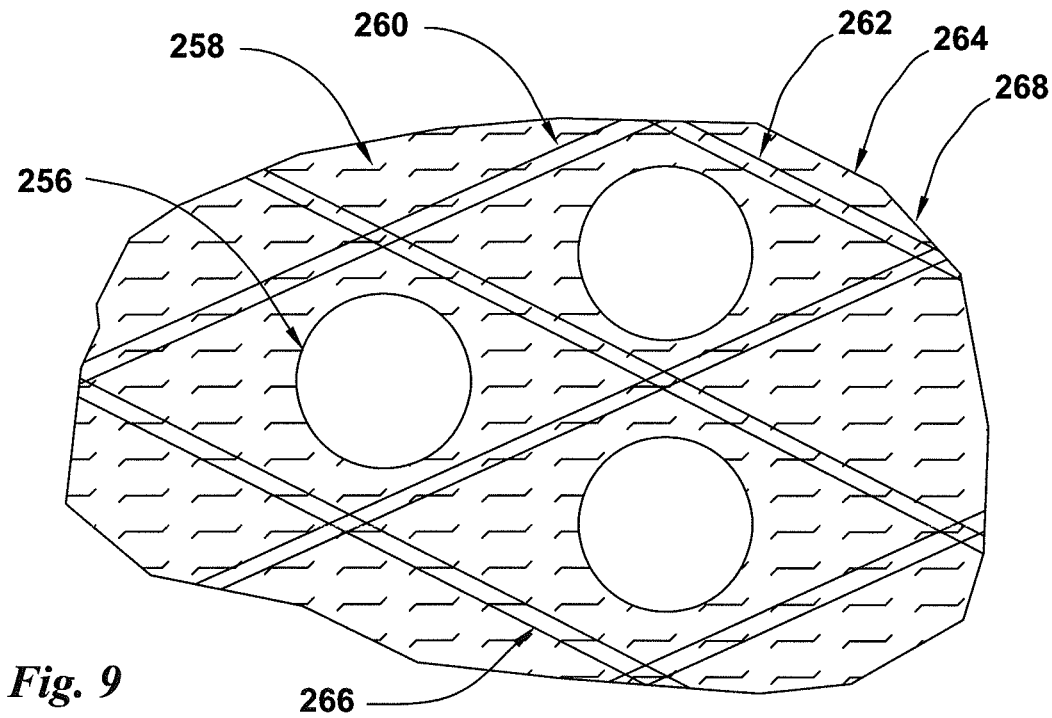
FIG. 9 is a top view of an island disc portion with grooved porous material between islands.

FIG. 9 is a top view of an island disc portion with grooved porous material between islands. A portion of an abrasive island disc 264 is shown with abrasive agglomerate islands 256 surrounded by a layer of porous erodible material 258. The porous erodible layer 258 can be bonded to the top surface of an abrasive disc backing 268 where the porous erodible layer 258 can have a top surface that can be level with the top surfaces of the islands 256. Diagonal grooves 260 and 262 are skived, ground or cut into the top surface of the porous erodible layer 258 is shown here to form rhombic shapes 266 that surround each island 256. The grooves 260 and 262 between the islands 256 can have many geometric patterns including diagonal, annular and radial lines, or serpentine line patterns. The grooves 260 and 262 extend from the top surface of the porous erodible layer 258 and partially into the depth of the porous erodible layer 258, close to or at the top surface of an abrasive disc backing 268.

Figure 10:
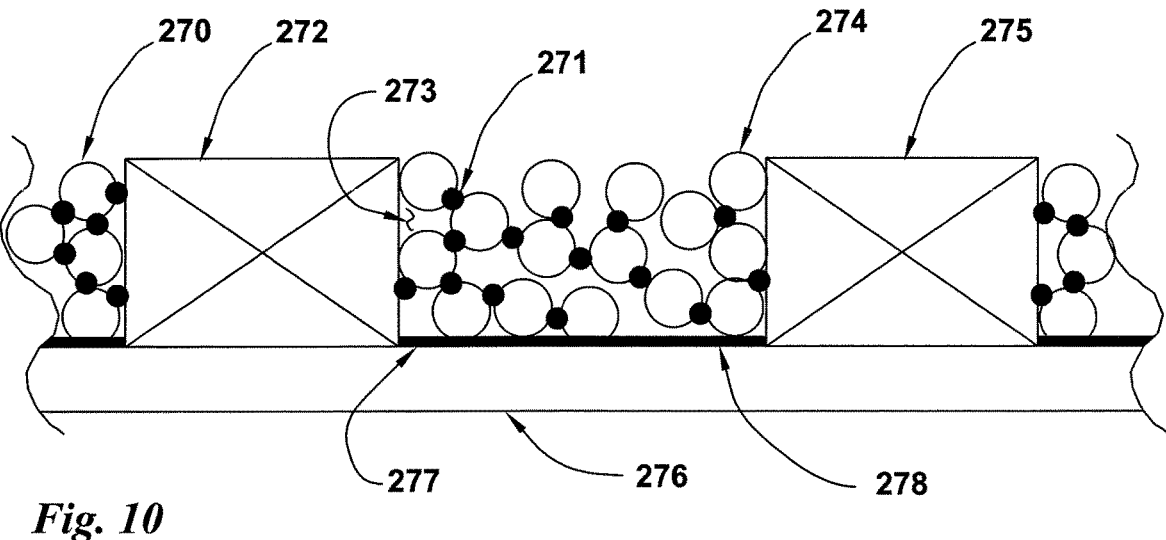
FIG. 10 is a side view of an island disc with a porous material between islands.

FIG. 10 is a side view of an island disc with a porous material between islands. Vitrified agglomerate islands 272 are attached to a disc backing 276 and an erodible porous layer 270 can be bonded with an adhesive 278 to the top surface of the disc backing 276. The erodible porous layer 270 can be shown as made up of rigid but erodible foamed glass beads 274 that have a thin coat of adhesive (not shown) that concentrates in adhesive lumps 271 at the common joints between adjacent foamed glass beads 274 and bonds the individual foamed glass beads 274 to each other after the adhesive 271 can be solidified.

There are open void spaces 273 between the bonded foamed glass beads 274 which creates the erodible porous layer 270. In another embodiment in accordance with the present disclosure, an erodible foam material can be attached to or molded to the top surface 277 of the disc backing 276. The erodible porous layer 270 can be level with the top surface 275 of the islands 272.

Figure 11:
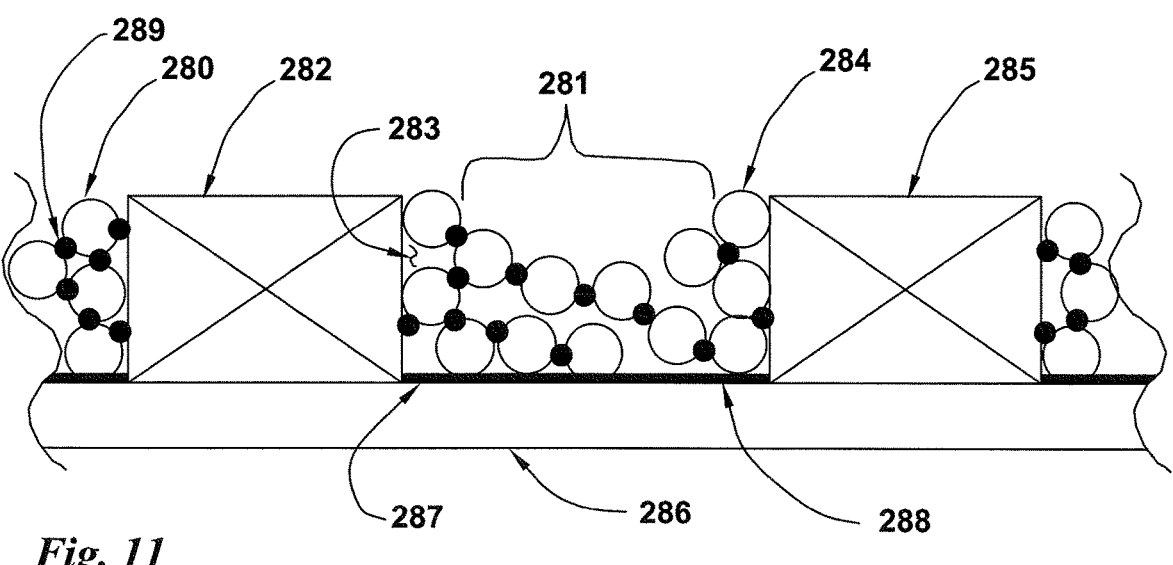
FIG. 11 is a side view of an island disc with a grooved porous material between islands.

FIG. 11 is a side view of an island disc with a grooved porous material between islands. Vitrified agglomerate islands 282 are attached to a disc backing 286 and an erodible porous layer 280 can be bonded with an adhesive 288 to the top surface of the disc backing 286. The erodible porous layer 280 is shown as made up of rigid but erodible foamed glass beads 284 that have a thin coat of adhesive (not shown) that concentrates in adhesive lumps 289 at the common joints between adjacent foamed glass beads 284 and that bonds the individual foamed glass beads 284 to each other after the adhesive 289 can be solidified. There are open void spaces 283 between the bonded foamed glass beads 284 which creates the erodible porous layer 280. In another embodiment in accordance with the present disclosure, an erodible foam material can be attached to or molded to the top surface 287 of the disc backing 286. The erodible porous layer 280 can be level with the top surface 285 of the islands 282. A groove 281 is shown in the erodible porous layer 280 that extends from the top surface of the can be level with the top surface 285 of the islands 282 and extends down into the depth of the erodible porous layer 280.

Numerous experiments were conducted where vitrified abrasive particle agglomerates were made and molded into island structures bonded to flexible polymer backing substrates to form raised island discs. Many of these vitrified agglomerate island discs having different diamond abrasive sizes, different formulations of the agglomerates and different types of island abrasive disc constructions were used in multiple tests to abrade sapphire wafers at high abrading speeds on an abrasive lapper machine. The abrade test results verified very high sapphire cut rates and very long island disc abrade lives.

These abrading tests have shown that water-spray cooled diamond abrasive agglomerate filled island on discs can be used to perform high-speed abrasive polishing of hard sapphire workpieces with very high cut rates without hydroplaning of water-sprayed wafers. Typically, three each 2" diameter sapphire wafers attached to a 6" polymer wafer disc had 0.006" wear in two minutes of abrade time when abraded by a 12" diameter disc having 550 island structures containing agglomerates having 40-50 micron diamond particles when both the wafer disc and the island disc are rotated at 500 rpm and cooled with a water spray. Other similar abrade tests had 0.012" sapphire wafer wear in two minutes. The 0.186 diameter islands typically wear about 0.001" during the sapphire polishing test. A wide range of abrading cut rates and disc abrade life can be affected by the percent of diamond particle content in the vitrified abrasive agglomerates, the size of the diamond particles, the island disc and agglomerate manufacturing processes, the abrade speeds, the abrade pressures and the abrade test time duration.

Another measure of the abrading life of the vitrified agglomerate island discs can be the ability of the 12" discs to quickly abrade off all of the very large 36 grit (0.019") aluminum oxide particles on a 6" ARC brand abrasive discs supplied by McMaster Carr at Chicago, IL The 6" abrasive discs are mounted on the wafer head of a lapper machine and used to abrade flat, into a mutual plane, the top surfaces of all the vitrified diamond abrasive particles islands on a 12" island disc attached to the lapper platen. The wafer head and the island disk platen are both rotated at 500 rpm and the wafer head abrasive disc can be slowly lowered for abrading contact during the abrading procedure over a period of 2 minutes. Typically, all of the large 36 grit aluminum oxide particles are ground completely off the 6" disc and less than 0.002" of the island agglomerates containing 30 micron (0.001") or 40-50 micron (about 0.002") diamond particle can be ground off. There are relatively few individual diamond abrasive particles present in the agglomerates.

This procedure of mounting a 6" abrasive disc on the lapper machine wafer head can be also used to grind away epoxy on the surface of the vitrified agglomerate islands to better expose the agglomerates to protrude above the surface of the islands to contact the sapphire wafers being polished. The 36 grit aluminum oxide abrasive particles are made of the same aluminum oxide material that sapphire wafers are made of Both are easily cut by the diamond abrasive particles.

Vitrified abrasive agglomerates are made by mixing abrasive particles and a glass frit material and heating it to a temperature sufficient to melt the glass frit material whereby the abrasive particles are encapsulated in a glass matrix. Then the mixture can be cooled to form a solidified vitrified abrasive and glass matrix material that can be fractured into vitrified abrasive agglomerates. Synthetic glass frit powder materials used in experiments included V3001, V1467 and V1558 supplied by the Ceradyne Division of 3M Company at Seattle, WA and 3227-2, RD682 and RD683 supplied by Ferro Corporation at Mayfield Heights, OH. The glass frit powdered material was selected and mixed with diamond particles of various sizes ranging from 0-2 micron to 70-85 microns. Diamond particles used in experiments were supplied by the Saint Gobain Company at Olyphant, PA. The mixtures are heated to temperatures of 500 to 700 degrees C. to form the vitrified mixtures that are cooled and solidified and then fractured into agglomerates that are less than 0.045" in size. Materials that produce a gas when heated can also be mixed with the abrasive particles and a glass frit mixture before furnace vitrification to produce a porous material that can be fractured into porous vitrified abrasive agglomerates to increase their erodibility.

Three different sized foamed glass beads with sizes of 0.5-1.0 mm, 0.25-0.50 mm and 0.10-0.40 mm supplied by Agsco Corporation, Libertyville, IL were used both in the production of the vitrified diamond agglomerate island structures and the porous erodible coating applied to the disc substrates between the island structure on the island discs. Adtech El-335 epoxy supplied from Express Composites at Minneapolis, MN was used to mold-form island structures on disc backing substrates and to form porous layers of bead materials that were bonded to disc backing substrates between island structures.

In one experiment, V1467 synthetic glass vitrified agglomerates with 40-50 micron diamond particles were mixed with foamed glass beads and epoxy and molded into 550 island structures using a 0.061" thick polymer mold having 0.186" circular through holes that was positioned in flat-surfaced contact on a 12" diameter polymer disc substrate. A layer of epoxy was deposited in each of the mold substrate holes and contacted the polymer disc substrate surface prior to deposition of the agglomerate-bead mixture in the holes. After the mixture was level-filled with the polymer mold substrate surface, epoxy was then applied to the top surfaces of the level-filled agglomerate-bead mixture top surfaces to infiltrate the agglomerate-bead mixture in the polymer mold substrate holes. The island disc was then heated in an oven at 150 degrees F. to solidify the epoxy. The vitrified agglomerate island disc was then used to abrade three 2" sapphire discs bonded to a polymer wafer disc where both the wafer disc and the island disc were rotated at 500 rpm on a lapper machine for 2 minutes using a water spray coolant.

In another experiment, 0.125 depth in a 1.0" plastic beaker of RD683 synthetic glass agglomerates containing 40-50 micron diamond particles and vitrified at 700 degrees C. that were fractured to less than 0.045" sizes and foamed glass beads with sizes of 0.5-1.0 mm, 0.25-0.50 mm and 0.10-0.40 mm were mixed with 0.62 g of epoxy to surface coat both the agglomerates and glass beads with a thin layer of epoxy. The epoxy surface-coated agglomerates and beads were then deposited and level-filled into 550 circular through-holes in a 0.061" thick polymer mold substrate having 0.186" hole diameters where the mold substrate was positioned in flat-surfaced contact on a 0.053" thick 12" diameter polyester disc substrate. A layer of epoxy was deposited in each of the mold substrate holes and contacted the polymer disc substrate sandpaper roughened surface prior to deposition of the agglomerate-bead mixture in the holes. After the mixture was level-filled with the polymer mold substrate surface, epoxy was then applied to the top surfaces of the level-filled agglomerate-bead mixture top surfaces to infiltrate the agglomerate-bead mixture in the polymer mold substrate holes. The island disc was then heated in an oven at 150 degrees F. for 60 minutes to solidify the epoxy.

A porous island gap space erodible material was then attached to the backing substrate top surface in the gap spaces between adjacent abrasive island structures. Here, gap spaces between the island structures on the 12" disc substrate was coated with a layer of epoxy. Then 0.5-1.0 mm foamed glass beads where mixed with epoxy to apply a thin coating of epoxy on the individual beads and the mixture was deposited on the epoxy-coated island disc surface between the island structures and levelled with the top surfaces of the island structures. The island disc was then placed in a 150 degree oven for 60 minutes to solidify the epoxy. The island gap bead material was porous and erodible. Shallow grooves were then cut into the porous island gap space erodible material bonded to the island disc by skiving lines between rows and columns of islands, leaving diamond-shaped areas of erodible gap spaced material surrounding each of the 550 island structures on the 12" island disc.

The vitrified agglomerate 12" island disc having 40-50 micron diamond particles was then used to abrade three 2" sapphire wafer discs bonded to a 6" polymer wafer disc where both the wafer disc and the island disc were rotated at 500 rpm on a lapper machine for 2 minutes using a water spray coolant. During multiple 2-minute abrading experiments, the sapphire wafers experienced approximately 0.006" wear when 10 psi of abrade pressure was applied to the wafers.

Many other experiments were conducted with 6" diameter discs having an annular band of 158 abrasive agglomerate filled islands having a 0.186" diameter and a 0.061 height where 2" diameter sapphire wafers slightly overhung the annular band of abrasive islands filled with 30 micron diamond particles. It is advantageous for the wafers to overhang the annular band of abrasive islands to provide uniform wear of both the islands and the wafer during the wafer abrading event. Both the 2" sapphire wafer and the abrasive island disc were rotated in the same rotational direction at 1,000 rpm with an abrading pressure of 10 psi on the wafer for a total abrade time of 60 seconds with a water mist spray applied to the rotating island disc during the abrading event. An average of 0.003" of material was removed from the sapphire wafer during each 60 second abrading event that occurred with 5 or more abrading events that were done sequentially after the wafers were removed from the test setup and measured for wear with a Mitutoyo Digital Micrometer after each abrading event. The same 2" diameter sapphire wafer was used sequentially in the series of abrading events.

Also, multiple vitrified diamond abrasive agglomerate filled islands 6" diameter polymer backed discs that had nominal 1.75" wide annular bands of islands were used to abrade 2" diameter sapphire wafers that were positioned to overhang both the inner and outer diameters of the annular band of islands on the discs as both the abrasive discs and the wafers were rotated at 500 rpm in the same direction with a 10 psi abrading pressure applied to the 2" wafer for the full duration of 60 seconds of wafer abrade time. The amount of material removed from the 2" diameter sapphire wafers during each independent 60 second abrading test using 30 micron diamonds vitrified in agglomerates ranged from 0.002" to 0.004". When a series of abrade events were completed, the total sapphire wafer wear was 0.00174" and the total average island wear was 0.0015" (out of a nominal island height of 0.061". In another series of abrade events, the total sapphire wafer wear was 0.021" and the total average island wear was 0.002". This abrade data verifies that sapphire wafer cut rates were very high in short abrade times at high abrade speeds (of only 500 rpm) and that the islands successfully eroded during the abrade events to continually expose the diamond particle filled agglomerates with water spray wafer cooling. Abrading cut rates increase even more when the abrading speeds are increased to 3,000 rpm.

Other abrasive including aluminum oxide and CBN can be encapsuled in the vitrified agglomerates by the glass. The glass structurally supports the diamond, or other, abrasive particles within the agglomerates and the epoxy, or other adhesive, support the agglomerates formed into island structures that are attached to flexible polymer, metal or organic backings. The abrasive articles can have a disc shape or a rectangular shape or can be constructed into continuous belts.

For a given diamond particle size, the wafer cut rate and the erodibility of the islands is a function of the percent diamonds in the agglomerates, the percent glass in the agglomerates, the percent of agglomerates in the island structures, the percent adhesive in the island structures and the type and quantity of the filler materials in the island structures. All of these variables can be optimized to provide high wafer or workpiece cut rates and the desired abrade life of the vitrified diamond agglomerate island abrasive discs.

The sapphire abrading tests, using the island discs having the porous island gap space erodible material between the adjacent islands, was very effective in providing cooling by the water spray applied to the rotating island disc to the full abraded wafer surface. Here, the water film cooling the water did not cause hydroplaning of the wafer even at the high rotating speed of 500 rpm.

Filler material in the island structures allowed the islands to erode during the wafer abrading events where the islands eroding continually exposed the vitrified diamond abrasive agglomertaes that abraded the sapphire wafer to provide continual wear of the wafer over the full 60 second abrading event. The diamond particle sizes encapsulated in the vitrified agglomerates by the melted glass can range from submicron size to greater-than-50 micron size. The diamond particles can be used to abrade very hard material including sapphire, silicon carbide (SiC), gallium nitride (GaN), hard ceramics including aluminum oxide and carbides and hard metals.

In a further experiment, 7.5 g of RD683 glass frit was mixed with 2.5 g of 30 micron diamond particles and 2.5 g of alcohol that was heated to 700 degrees C. in a furnace for a total of 120 minutes and cooled to solidify it. Then the solidified vitrified mixture was fractured into vitrifies abrasive agglomerates that were less than 0.045" in size. The 30 micron diamond agglomerates were mixed with foamed glass beads and epoxy and deposited into holes in a mold disc to bond them to the sandpaper roughened 0.053 thick 12" diameter polyester disc substrate to form 550 vitrified agglomerate island structures on the disc. A layer of erodible foamed glass beads was mixed with epoxy and spread on an epoxy coated island disc between island structures. After epoxy solidification, grooves were cut into the erodible bead layer between the islands. The vitrified agglomerate island disc was then used to abrade three 2" sapphire discs bonded to a 6" polymer wafer disc where both the wafer disc and the island disc were rotated at 500 rpm on a lapper machine for 2 minutes using a water spray coolant.

The efficacy of the porous filler layer between adjacent island structures bonded to a disc backing was verified by adding the porous bead filler material to an existing island disc. When a 12" diameter island disc, not having the porous bead filler material between the islands, was used to abrade sapphire wafers at 500 rpm, some of the wafers had slightly recessed wafer center surfaces after the abrading operation. Insufficient cooling of the wafer centers occurred with this disc where friction heat from the abrading action caused overheating and slight expansion of the wafer center localized areas. Disc island abrading action was then concentrated at the wafer center "high spot" areas where more sapphire material was removed from the expanded wafer centers than at the wafer edges. After the abrading procedure, the wafers were cooled, and the over-abraded wafer centers were slightly recessed from the wafer edges, resulting in non-flat wafers. A porous erodible layer of foamed glass beads was added on the same 12" disc between the island structures that contained diamond abrasive particle filled agglomerates. When this disc was used to abrade the sapphire wafers at the same 500 rpm speeds, there were no recessed surface areas at the center of the wafers. The porous erodible layer between the islands carried coolant water across the whole wafer surface and prevented localized overheating of the wafer surface.

A vitrified abrasive raised island article is described comprising:

a) a flexible polymer or metal circular backing substrate having a backing substrate top surface, a backing substrate bottom surface, a backing substrate diameter and a backing substrate thickness;

b) a mixture of abrasive particles and a glass frit material was heated to a temperature sufficient to melt the glass frit material thereby encapsulating the abrasive particles in a glass matrix and wherein the abrasive and glass matrix material was cooled to form a solidified vitrified abrasive and glass matrix material and wherein the solidified vitrified abrasive and glass matrix material is fractured to produce vitrified abrasive agglomerates;

c) wherein a mixture of vitrified abrasive agglomerates and an island adhesive are mold-formed into abrasive island structures wherein the island adhesive is solidified and bonds the abrasive island structures to the backing substrate top surface;

d) wherein the abrasive island structures have abrasive island structure shapes, abrasive island structure sizes, abrasive island structure thicknesses and abrasive island structure flat top surfaces;

e) wherein the abrasive island structures are bonded to the backing substrate in an array pattern band having an array pattern band approximate annular shape, an array pattern band approximate annular outer diameter, an array pattern band approximate annular inner diameter and wherein gap spaces exist between adjacent abrasive island structures;

f) a porous island gap space erodible material that is attached to the backing substrate top surface in the gap spaces between adjacent abrasive island structures wherein the porous island gap space erodible material has a top surface that is level with the abrasive island structures flat top surfaces.

Another embodiment is where the array band approximate annular shape is comprised of island structures arranged in patterns of columns and rows that have an array pattern band approximate annular shape, an array pattern band approximate annular outer diameter, an array pattern band approximate annular inner diameter and wherein gap spaces exist between adjacent abrasive island structures.

Further embodiments are where the array pattern band approximate annular outer diameter ranges from 70% to 100% of the backing substrate diameter and wherein the array pattern band approximate annular inner diameter ranges from 10% to 90% of the backing substrate diameter and where the backing substrate bottom surface is coated with a pressure sensitive adhesive and where the island adhesive compromises a solvent-based adhesive or a non-solvent adhesive.

In another embodiment, the mold-formed abrasive island structures are bonded to the backing substrate top surface using a mold substrate having a mold substrate material, a mold substrate top surface, a mold substrate bottom surface, a mold substrate size, a mold substrate shape, a mold substrate thickness and a pattern of selectively spaced mold substrate through-holes that extend through the mold substrate thickness.

Another embodiment is where the mold substrate through-holes have a mold substrate through-hole shape, a mold substrate through-hole cross-sectional area and a mold substrate through-hole cross-sectional area size.

In a further embodiment, the mold substrate bottom surface is positioned in flat surfaced conformal contact with the backing substrate top surface wherein a mixture of vitrified abrasive agglomerates and an island adhesive is deposited into the mold substrate through holes and wherein the mixture of vitrified abrasive agglomerates and an island adhesive contacts the backing substrate top surface and wherein the mixture of vitrified abrasive agglomerates and an island adhesive is level filled with the mold substrate top surface. Also, a binding adhesive is deposited into the mold substrate through holes before the mixture of vitrified abrasive agglomerates and an island adhesive is deposited into the mold substrate through holes wherein the binding adhesive contacts the backing substrate top surface and the mixture of vitrified abrasive agglomerates and an island adhesive contacts the binding adhesive.

Another embodiments are where the mixture of vitrified abrasive agglomerates and an island adhesive is solidified by polymerization or solvent evaporation or by energy sources selected from the group consisting of heat, electron beam, ultraviolet or combinations thereof and the abrasive particles have selected sizes and the abrasive particles are selected from the group consisting of diamond, silicon carbide, boron carbide, cubic boron nitride, aluminum oxide, ceria, silica and combinations thereof.

In other embodiments, an agglomerate binding adhesive is deposited into the mold substrate through holes and coats the backing substrate top surface at the locations of the mold substrate through holes before the mixture of vitrified abrasive agglomerates and an island adhesive is deposited into the mold substrate through holes. Also, a binding adhesive is deposited on the backing substrate top surface and coats the backing substrate top surface before the mold substrate bottom surface is positioned in flat surfaced conformal contact with the backing substrate top surface.

In another embodiment, the mixture of vitrified abrasive agglomerates and an island adhesive also has an abrasive agglomerate erodible filler wherein the abrasive agglomerate erodible filler comprises erodible fillers selected from the group consisting of walnut shell particles, hollow glass beads, hollow polymer beads, organic material particles, foamed glass beads and combinations thereof.

And, in another embodiment, the mixture of vitrified abrasive agglomerates and an island adhesive is porous wherein the vitrified abrasive agglomerates are structurally supported by the vitrified abrasive agglomerate island adhesive that mutually bonds adjacent abrasive agglomerates and voids exist between adjacent abrasive agglomerates.

In a further embodiment, the porous island gap space erodible material is a polymer foam material that is attached to the backing substrate top surface in the gap spaces between adjacent abrasive island structures wherein the porous island gap space erodible material has a top surface that is level with the abrasive island structures flat top surfaces.

In a another embodiment, the porous island gap space erodible material is constructed from erodible material particles or beads selected from the group consisting of walnut shell particles, hollow glass beads, solid polymer beads, hollow polymer beads, organic material particles, foamed glass beads and combinations thereof wherein the selected erodible material particles or beads are coated with an adhesive, mixed together and deposited on the backing substrate top surface in the gap spaces between adjacent abrasive island structures wherein the erodible material particles or beads contact adjacent erodible material particles or beads wherein the adjacent selected erodible material particles or beads are bonded together at their mutual adhesive coated contact points leaving voids between the adjacent selected erodible material particles or beads to form a porous island gap space erodible material.

In other embodiments, the backing substrate circular diameter ranges from 1 inch to 144 inches, the backing substrate circular diameter ranges from 1 inch to 144 inches, the mold substrate through-hole cross-sectional area size ranges from 0.050 inches to 2.0 inches, the glass frit material is a synthetic glass frit material and where grooves are formed, molded or cut in the porous island gap space erodible material top surface.

In a further embodiment, a process is described for using vitrified abrasive materials to produce abrasive island discs comprising:

a) providing a flexible polymer or metal circular backing substrate having a backing substrate top surface, a backing substrate bottom surface, a backing substrate diameter and a backing substrate thickness;

b) providing a mixture of abrasive particles and a glass frit material and heating it to a temperature sufficient to melt the glass frit material thereby encapsulating the abrasive particles in a glass matrix and cooling the abrasive and glass matrix material to form a solidified vitrified abrasive and glass matrix material and fracturing the solidified vitrified abrasive and glass matrix material into vitrified abrasive agglomerates;

c) providing a mixture of vitrified abrasive agglomerates and an island adhesive and molding the mixture of vitrified abrasive agglomerates and an island adhesive into abrasive island structures and solidifying the island adhesive wherein the island adhesive bonds the abrasive island structures to the backing substrate top surface;

d) forming the abrasive island structures to have abrasive island structure shapes, abrasive island structure sizes, abrasive island structure thicknesses and abrasive island structure flat top surfaces;

e) bonding the abrasive island structures to the backing substrate in an array pattern band having an array pattern band approximate annular shape, an array pattern band approximate annular outer diameter, an array pattern band approximate annular inner diameter and wherein gap spaces exist between adjacent abrasive island structures;

f) providing a porous island gap space erodible material that is attached to the backing substrate top surface in the gap spaces between adjacent abrasive island structures wherein the porous island gap space erodible material has a top surface that is level with the abrasive island structures flat top surfaces.

The methods and systems of the present disclosure, as described above and shown in the drawings, among other things, provide for improved methods and systems in the art. It will be apparent to those skilled in the art that various modifications and variations can be made in the devices and methods of the present disclosure without departing from the spirit or scope of the disclosure. Thus, it is intended that the present disclosure include modifications and variations that are within the scope of the subject disclosure and equivalents. Additionally, to the extent not already incorporated, each and every patent and patent application referenced herein is incorporated by reference herein in its entirety.

What is claimed is:

1. A vitrified abrasive raised island article comprising:

a) a polymer or metal circular backing substrate having a backing substrate top surface, a backing substrate bottom surface, a backing substrate diameter and a backing substrate thickness;

b) a mixture of abrasive particles and a glass frit material heated to a temperature sufficient to melt the glass frit material thereby encapsulating the abrasive particles in a glass matrix thereby forming an abrasive and glass matrix material and wherein the abrasive and glass matrix material is fractured to produce vitrified abrasive agglomerates;

c) wherein a mixture of the vitrified abrasive agglomerates and an island adhesive are mold-formed into abrasive island structures wherein the island adhesive is solidified and bonds the abrasive island structures to the backing substrate top surface;

d) wherein the abrasive island structures have abrasive island structure shapes, abrasive island structure sizes, abrasive island structure thicknesses and abrasive island structure flat top surfaces;

e) wherein the abrasive island structures are bonded to the backing substrate top surface in an array pattern band having an array pattern band substantially annular shape, an array pattern band substantially annular outer diameter, an array pattern band substantially annular inner diameter and wherein gap spaces exist between adjacent abrasive island structures;

f) a porous island gap space erodible material that is attached to the backing substrate top surface in the gap spaces between adjacent abrasive island structures wherein the porous island gap space erodible material has a top surface that is level with the abrasive island structures flat top surfaces.

2. The article of claim 1 wherein the array band substantially annular shape is comprised of island structures arranged in patterns of columns and rows that have an array pattern band substantially annular shape, an array pattern band substantially annular outer diameter, an array pattern band substantially annular inner diameter and wherein gap spaces exist between adjacent abrasive island structures.

3. The article of claim 1 wherein the array pattern band substantially annular outer diameter ranges from 70% to 100% of the backing substrate diameter and wherein the array pattern band substantially annular inner diameter ranges from 10% to 90% of the backing substrate diameter.

4. The article of claim 1 wherein the backing substrate bottom surface is coated with a pressure sensitive adhesive.

5. The article of claim 1 wherein the island adhesive comprises a solvent-based adhesive or a non-solvent based adhesive.

6. The article of claim 1 wherein the mold-formed abrasive island structures are bonded to the backing substrate top surface using a mold substrate having a mold substrate material, a mold substrate top surface, a mold substrate bottom surface, a mold substrate size, a mold substrate shape, a mold substrate thickness and a pattern of selectively spaced mold substrate through-holes that extend through the mold substrate thickness.

7. The article of claim 6 wherein the mold substrate through-holes have a mold substrate through-hole shape, a mold substrate through-hole cross-sectional area and a mold substrate through-hole cross-sectional area size.

8. The article of claim 7 wherein the mold substrate bottom surface is positioned in flat surfaced conformal contact with the backing substrate top surface wherein the mixture of the vitrified abrasive agglomerates and the island adhesive is deposited into the mold substrate through holes and wherein the mixture of the vitrified abrasive agglomerates and the island adhesive contacts the backing substrate top surface and wherein the mixture of the vitrified abrasive agglomerates and the island adhesive is level filled with the mold substrate top surface.

9. The article of claim 8 wherein an agglomerate binding adhesive is deposited into the mold substrate through holes and coats the backing substrate top surface at the locations of the mold substrate through holes before the mixture of the vitrified abrasive agglomerates and the island adhesive is deposited into the mold substrate through holes.

10. The article of claim 8 wherein a binding adhesive is deposited on the backing substrate top surface and coats the backing substrate top surface before the mold substrate bottom surface is positioned in flat surfaced conformal contact with the backing substrate top surface.

11. The article of claim 7 wherein the mold substrate through-hole cross-sectional area size ranges from 0.050 inches to 2.0 inches.

12. The article of claim 1 wherein the abrasive particles have selected sizes and the abrasive particles are selected from the group consisting of diamond, silicon carbide, boron carbide, cubic boron nitride, aluminum oxide, ceria, silica and combinations thereof.

13. The article of claim 1 wherein the mixture of the vitrified abrasive agglomerates and the island adhesive also has an abrasive agglomerate erodible filler wherein the abrasive agglomerate erodible filler comprises erodible fillers selected from the group consisting of walnut shell particles, hollow glass beads, hollow polymer beads, organic material particles, foamed glass beads and combinations thereof.

14. The article of claim 1 wherein the mixture of the vitrified abrasive agglomerates and the island adhesive is porous wherein the vitrified abrasive agglomerates are structurally supported by the vitrified abrasive agglomerate island adhesive that mutually bonds adjacent abrasive agglomerates and voids exist between adjacent abrasive agglomerates.

15. The article of claim 1 wherein the porous island gap space erodible material is a polymer foam material that is attached to the backing substrate top surface in the gap spaces between adjacent abrasive island structures wherein the porous island gap space erodible material has a top surface that is level with the abrasive island structures flat top surfaces.

16. The article of claim 1 wherein the porous island gap space erodible material is constructed from erodible material particles or beads selected from the group consisting of walnut shell particles, hollow glass beads, solid polymer beads, hollow polymer beads, organic material particles, foamed glass beads and combinations thereof wherein the selected erodible material particles or beads are coated with an adhesive, mixed together and deposited on the backing substrate top surface in the gap spaces between adjacent abrasive island structures wherein the erodible material particles or beads contact adjacent erodible material particles or beads wherein the adjacent selected erodible material particles or beads are bonded together at their mutual adhesive coated contact points leaving voids between the adjacent selected erodible material particles or beads to form the porous island gap space erodible material.

17. The article of claim 1 wherein grooves are formed, molded or cut in the porous island gap space erodible material top surface.

18. The article of claim 1 wherein the backing substrate circular diameter ranges from 1 inch to 144 inches.

19. The article of claim 1 wherein the glass frit material is a synthetic glass frit material.

20. A process for using vitrified abrasive materials to produce abrasive island discs comprising:

a providing a polymer or metal circular backing substrate having a backing substrate top surface, a backing substrate bottom surface, a backing substrate diameter and a backing substrate thickness;

b) providing a mixture of abrasive particles and a glass frit material and heating the mixture to a temperature sufficient to melt the glass frit material thereby encapsulating the abrasive particles in a glass matrix thereby forming an abrasive and glass matrix material, cooling the abrasive and glass matrix material, and fracturing the solidified vitrified abrasive and glass matrix material into vitrified abrasive agglomerates;

c) providing a mixture of the vitrified abrasive agglomerates and an island adhesive and molding the mixture of the vitrified abrasive agglomerates and the island adhesive into abrasive island structures and solidifying the island adhesive wherein the island adhesive bonds the abrasive island structures to the backing substrate top surface;

d) forming the abrasive island structures to have abrasive island structure shapes, abrasive island structure sizes, abrasive island structure thicknesses and abrasive island structure flat top surfaces;

e) bonding the abrasive island structures to the backing substrate in an array pattern band having an array pattern band substantially annular shape, an array pattern band substantially annular outer diameter, an array pattern band substantially annular inner diameter and wherein gap spaces exist between adjacent abrasive island structures;

f) providing a porous island gap space erodible material that is attached to the backing substrate top surface in the gap spaces between adjacent abrasive island structures wherein the porous island gap space erodible material has a top surface that is level with the abrasive island structures flat top surfaces.

* * * * *